United States Patent
Stevens

(10) Patent No.: US 6,628,093 B2
(45) Date of Patent: Sep. 30, 2003

(54) POWER INVERTER FOR DRIVING ALTERNATING CURRENT LOADS

(76) Inventor: Carlile R. Stevens, 4119 Highway 2147 Suite 6, Marble Falls, TX (US) 78654

(*) Notice: Subject to any disclaimer, the term of this patent is extended or adjusted under 35 U.S.C. 154(b) by 33 days.

(21) Appl. No.: 10/104,076

(22) Filed: Mar. 21, 2002

(65) Prior Publication Data

US 2002/0145886 A1 Oct. 10, 2002

Related U.S. Application Data

(60) Provisional application No. 60/281,841, filed on Apr. 6, 2001.

(51) Int. Cl.[7] .................................................. G05F 1/00
(52) U.S. Cl. ................. 315/291; 315/307; 315/DIG. 4; 315/94; 315/106
(58) Field of Search .................................. 315/291, 292, 315/307, 224, 225, 316, DIG. 4, 105, 106, 107, 94

(56) References Cited

U.S. PATENT DOCUMENTS

| | | | | |
|---|---|---|---|---|
| 5,600,211 A | * | 2/1997 | Luger | 315/307 |
| 5,828,187 A | * | 10/1998 | Fischer | 315/291 |
| 6,072,283 A | * | 6/2000 | Hedrei et al. | 315/307 |
| 6,150,773 A | * | 11/2000 | Ribarich et al. | 315/291 |
| 6,259,215 B1 | * | 7/2001 | Roman | 315/307 |
| 6,304,039 B1 | * | 10/2001 | Appelberg et al. | 315/169.3 |
| 6,320,329 B1 | * | 11/2001 | Wacyk | 315/291 |

* cited by examiner

*Primary Examiner*—Don Wong
*Assistant Examiner*—Tuyet T. Vo
(74) *Attorney, Agent, or Firm*—Roger A. Marrs

(57) ABSTRACT

The invention discloses a power inverter using a microprocessor directly drawing the switching transistors and a circuit for computation of the actual power delivered to the load of a switching inverter. In addition, load variation power is achieved by adjusting the frequency or the pulse width of each half cycle and, in the case where a lamp or panel is involved, dimming. Also disclosed is that the microprocessor can be responsive to photometric input to adjust output as well as power line carrier information supplied on the input power to the device.

2 Claims, 4 Drawing Sheets

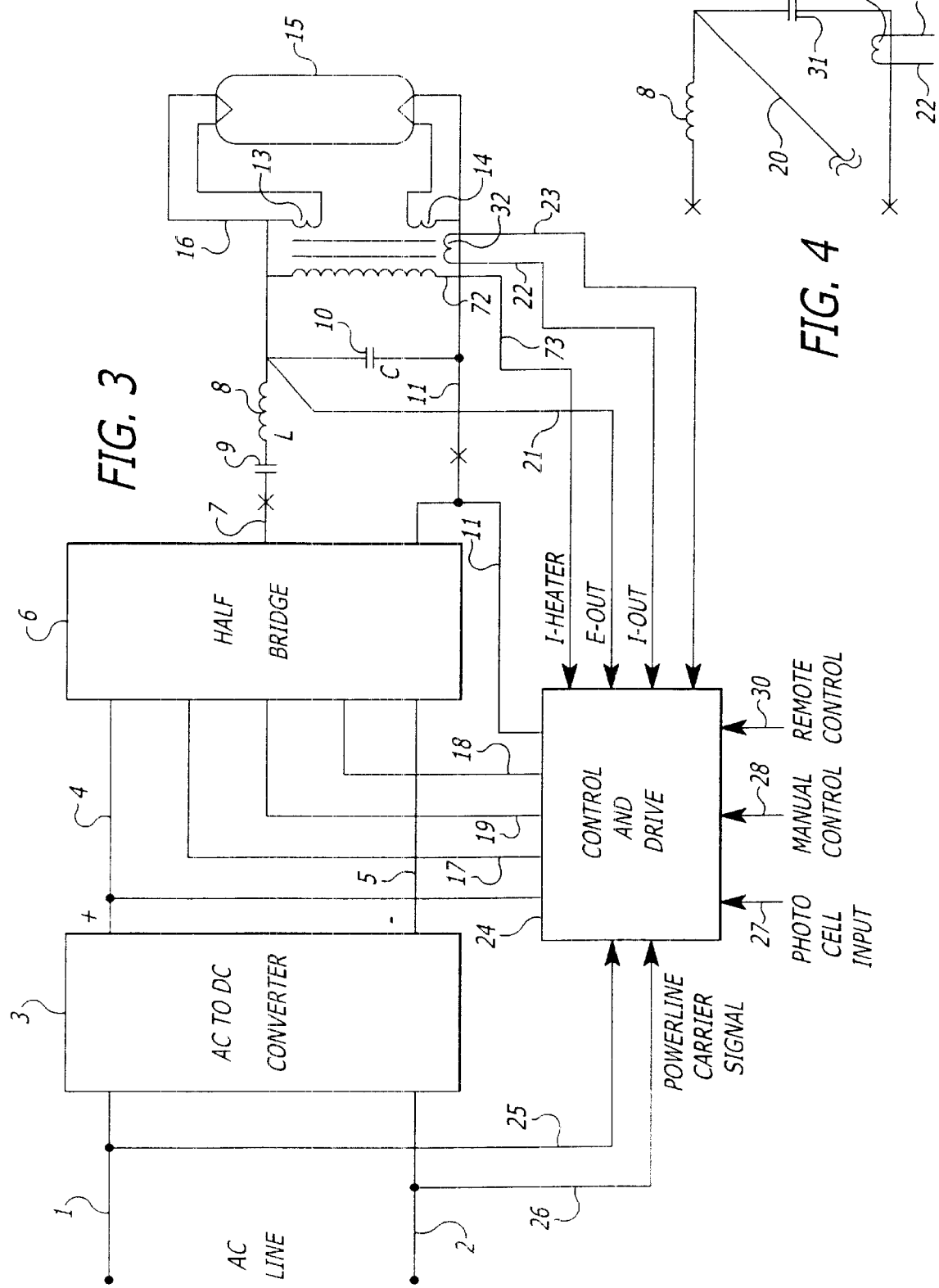

POWER INVERTER FOR DRIVING ALTERNATING CURRENT LOADS

This application claims the benefit of Provisional Application No. 60/281,841 filed Apr. 6, 2001.

BACKGROUND OF THE INVENTION

1. Field of the Invention

The present invention relates to the field of power inverters and to such an inverter for the conversion of an AC or DC supply of power to typically high frequency output power to drive gas discharged lighting sources including fluorescent tubes, HID (high intensity discharge lamps), and UV generating lamps as well as flat panel displays. The system is such that the output power is responsive to a variation in the drive frequency or pulse width. The frequency or pulse width is adjusted by a microprocessor, which in fact, is the oscillator for developing the output frequency.

2. Brief Description of the Prior Art

There are many varied public domain circuits involving the generation of high frequency inputs for driving fluorescent lamps, compact fluorescent lamps, high intensity discharge and other forms of gas discharged lighting. The general terms for such circuits is "switching inverters".

There are two basic ways of generating AC output power. The first is a conventional push-pull amplifier utilizing two transistors switching alternately to a common bus as shown in FIG. 1. The second is a full or half bridge, which normally does not require a transformer unless isolation is needed, where current is alternately switched from the supply and then to the common as shown in FIG. 2. The novelty of active patents normally involves how these transistors are switched. An example of a novel half bridge configuration is my U.S. Pat. No. 5,841,650 issued Nov. 24, 1998 which shows a resonant half bridge inverter. The frequency is determined by the resonant frequency of the inductance and capacitance values along with the impedance of the load. Such circuits work fine as long as the output is held at a pre-determined value. Thus, the components are selected to supply the appropriate output power. If it is desirable to vary the output power such as dimming a lamp, it is necessary to vary the frequency or the on time of each of the switching transistors to control the amount of energy delivered to the output.

Each type of inverter has its advantages and disadvantages. The push-pull method, often referred to as the parallel resonant inverter, when it is self oscillating, is easier to drive as both switches are connected to the common bus. However this configuration requires much higher voltage switching devices than the bridge method, in addition push-pull switching has never reached the efficiency of a bridge operation.

Bridge inverters require lower voltage switches but are harder to drive as one of the switches is not connected to the common bus. See FIG. 2. When resonance is employed, a runaway condition can occur if proper feedback is not introduced to control the frequency. The saturating core inverter drive is good for low cost designs as in a limited number of components are needed. However, it is not exceptionally tolerant of variations in loads and input voltages.

The most efficient circuit relative to its cost, is the driven half bridge with a partially or fully resonant load. The problems that have arisen with this type of circuit involve out of the ordinary conditions where the load is suddenly interrupted by lamp failure or breakage, or where a lamp will not start due to age, temperature, or other reasons. The driving circuit must constantly monitor output, current and voltage, in order to make sure that no damage occurs when any of these unexpected events occurs. Up to now this has involved a very complex amount of logic circuitry and extra expensive design of the resonant components. The cost of which has offset the savings by the higher efficiency and performance of the circuit.

SUMMARY OF THE INVENTION

Accordingly, the above problems and difficulties are obviated by the present invention which incorporates a microprocessor to determine all the logic functions in software rather than hardware. In addition, a driving oscillator maybe eliminated since the microprocessor can supply the driving frequency. Because almost any function can be specified in software, the device may become much more versatile driving many different types of loads with the same circuitry.

Three types of driving theory are employed. The first, allows a feedback to maintain the output circuitry at resonance or at some offset from resonance regardless of the frequency. This is particularly useful when the load is likely to vary a great deal in terms of its capacitance or resistance. Thus the microprocessor can maintain the output at resonance for full output or at some offset from resonance to adjust the amount of output regardless of the frequency needed to do this. Frequency will be adjusted to maintain the output components at resonance. This is accomplished through feeding back the phase angle of the AC signal, at the junction of the major series resonant components, to the microprocessor chip such that the proper phase angle can be maintained for resonant operation. Output voltage and current are also fed back in order for the chip to monitor and prevent unstable operation of the inverter should the load malfunction or be suddenly removed.

A second method of drive involves setting the frequency to control the output power based on operating on one side of a resonance curve. Here, as the output is decreased, the frequency normally will rise, and when the output is to be increased, the frequency is lowered. With this circuit the frequency is directly controlled by the feedback and not the resonant point as in the first option. Either mode of operation may be assumed simply by changing the software, thus reducing the number of hardware configurations necessary to enter a marketplace. The microprocessor further allows different options that heretofore would have been too expensive to add because of the amount of hardware required. One example would be the computation of the output power by taking, a feedback of the output voltage and the output current. The processor can multiply these two together to calculate the actual output power and adjust the frequency to maintain a predetermined amount of power regardless of the voltage or current.

A third method of adjusting the output power is by changing the on time of each of the switching transistors while maintaining the frequency at the resonant point. This is sometimes referred to as pulse width modulation. (PWM) .and can be done in two ways. One way is to lower the on time of each transistor while increasing the off time to maintain the same frequency. The second way is to lower the on time of one transistor while increasing the on time of the second transistor to maintain the frequency constant.

Several methods of control are made possible by the use of a microprocessor without the addition of expensive parts. One is to connect a photocell or light measuring device to the input of the microprocessor such that the output can be adjusted to maintain a particular light level. Another is to have, the microprocessor monitor for information on the power line such as a power line carrier signal or a phase chop dimming system like a SCR wall dimmer to request different output levels, in other words, dimming the lamp. Still another control method would be to allow the local control of the light level through the use of a remote control such as the ones that control a TV set.

Therefore, it is among the primary objects of this invention to supply a simple, but extremely versatile device for generating high frequency drive for gas discharged lamps or other devices that use a higher than line frequency drive.

It is another object of this invention to reduce the amount of hardware components to a minimum to accomplish this.

Yet another object of the invention is to allow for the output to be adjusted over a wide range of parameters such as power, light level local control and system control systems.

The final object of the invention is to accomplish the above objects for a price that makes the device acceptable in the marketplace.

BRIEF DESCRIPTION OF THE DRAWINGS

The features of the present invention which are believed to be novel are set forth with particularity in the appended claims. The present invention, both as to it organization and manner of operation, together with further objects and advantages thereof, may best be understood with reference to the following description, taken in connection with the accompanying drawings in which:

FIG. 3 is a circuit diagram of a control and drive module;

FIG. 4 is a circuit diagram of a connection for the electro-luminescent or flat panel display;

DESCRIPTION PREFERRED EMBODIMENT

Figure 1:
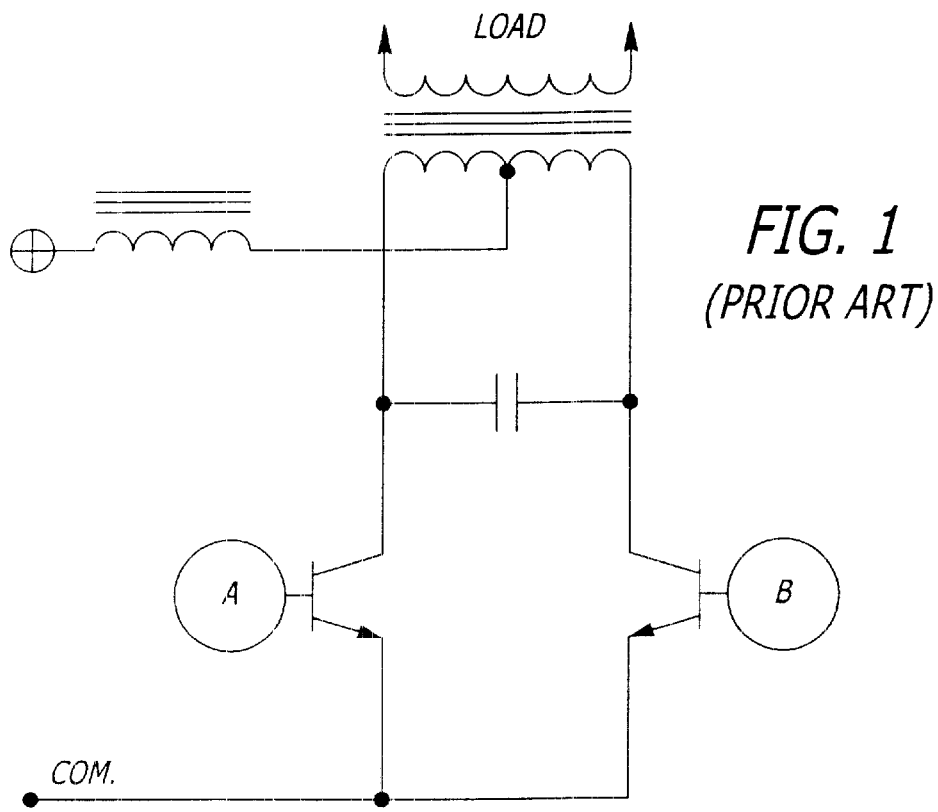
FIG. 1 is a circuit diagram of a push-pull amplifier as used in the prior art.

FIG. 1 shows a typical push-pull configuration using NPN transistors with drive input alternately applied at points A and then B. It is obvious that any form of switching device could be used including field effect transistors, vacuum tubes or even mechanical vibrators as used in old fashioned radios.

Figure 2:
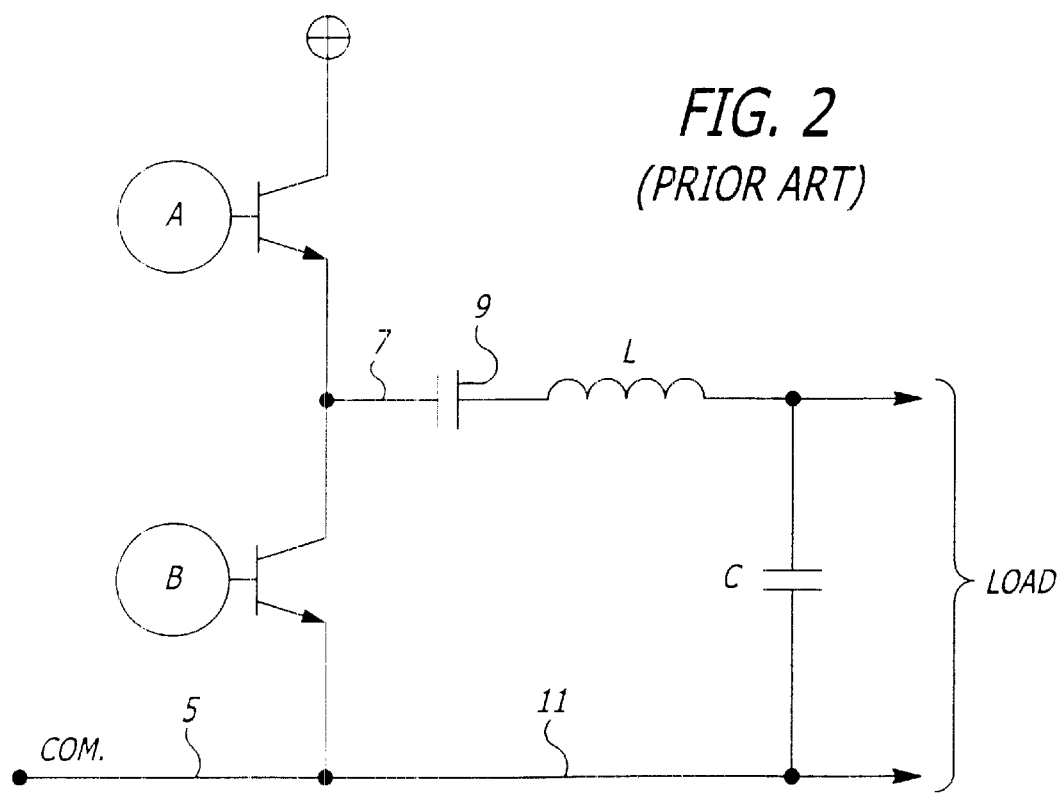
FIG. 2 is a circuit diagram of a fall or half bridge as used in the prior art.

FIG. 2 shows a half bridge configuration of inverter with switching alternately applied again between points A and B. Because switching device A is not connected to the common bus, only certain types of switches may be used practically in this application. For example, a vacuum tube would be very difficult but not impossible to apply here.

FIG. 3 is a block diagram of a preferred embodiment of the subject invention driving a gas discharge light source.

FIG. 4 depicts a change in the preferred embodiment of FIG. 3 to drive a flat panel display light source.

Figure 5:
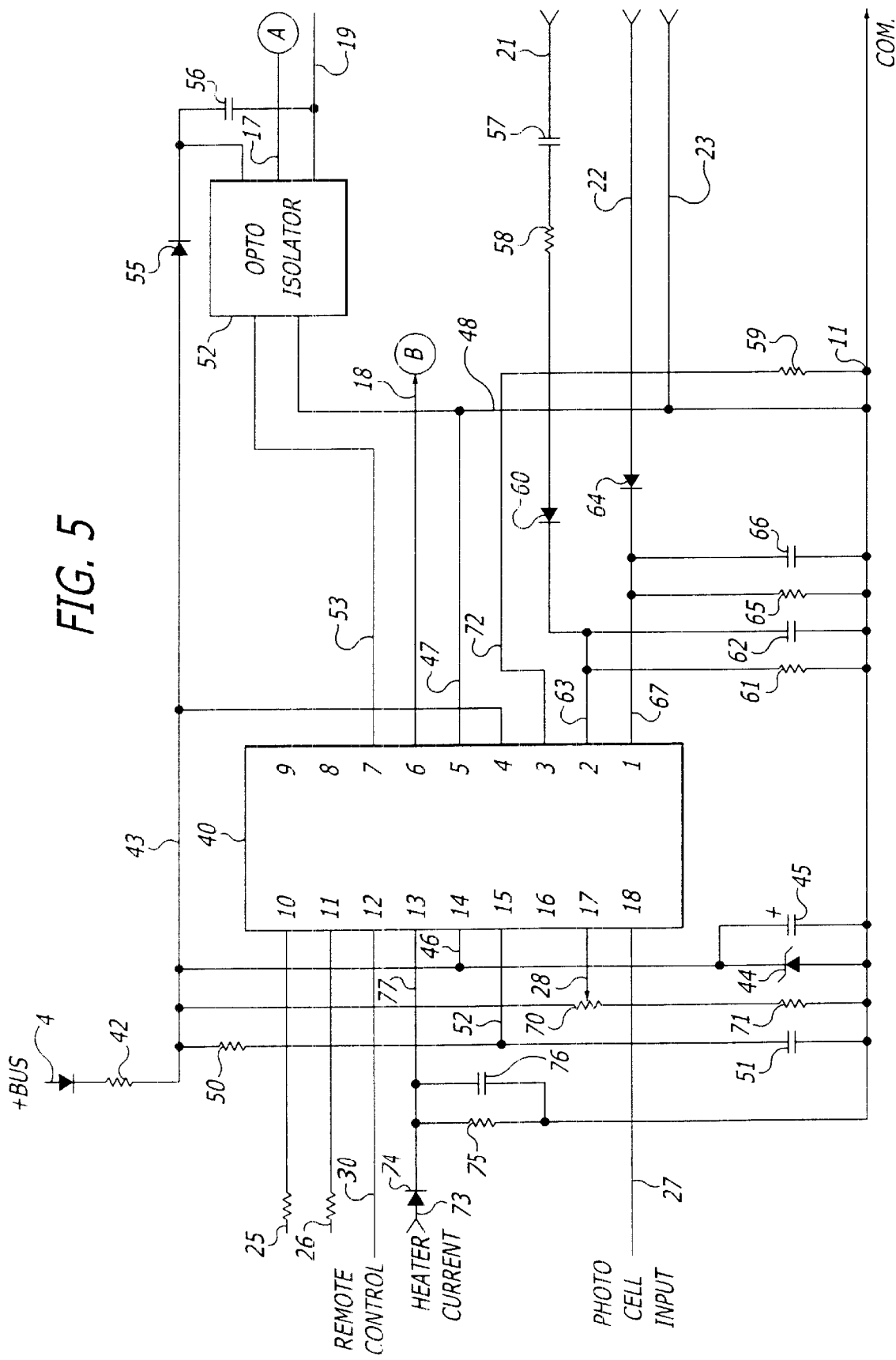
FIG. 5 is a circuit diagram illustrating a microprocessor chip employed in the power inverter of the present invention.

FIG. 5 is a schematic representation of the drive and control box of FIG. 3.

Figure 6:
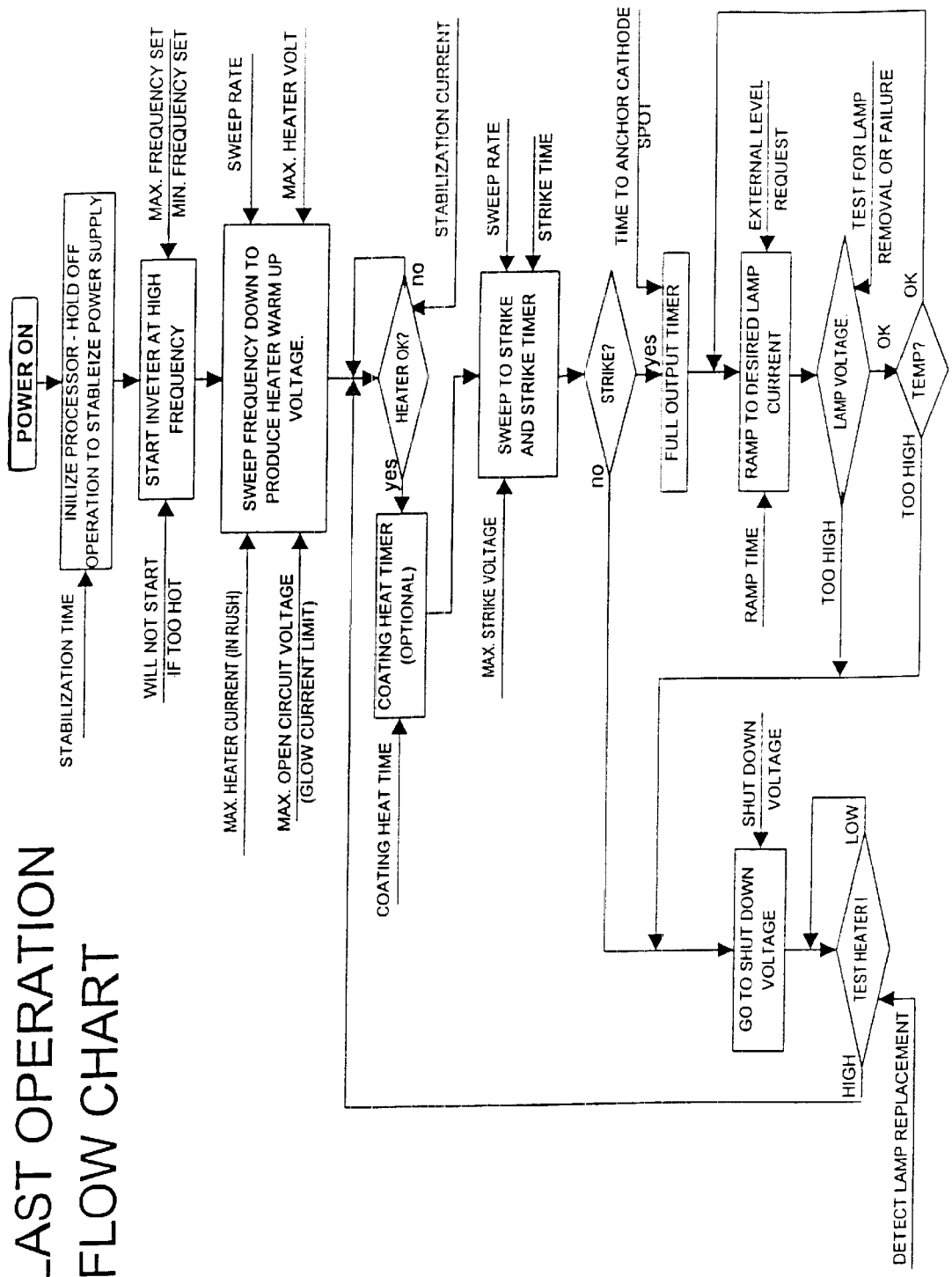
FIG. 6 is a block diagram of a software flow chart for a high frequency power supply.

FIG. 6 is the software flow chart of the most desirable way for a ballast to start a fluorescent lamp. The application of this starting process as shown on this flow chart is not possible in present day ballasts and can greatly prolong the life of the driven lamp.

OPERATIONAL DESCRIPTION OF THE PREFERRED EMBODIMENT

Electrical power enters from the AC power line on lines 1 and 2 to the AC to DC converter module 3 and leaves on lines 4 and 5 as plus and minus DC power. The AC to DC conversion module 3 can be any form of public domain conversion system, the simplest being a bridge rectifier and filter capacitor. Block 6 is the half bridge converter as shown in FIG. 2. Line 17 with connects point A of FIG. 2 from control and drive module 24. Line 18 connects point B of FIG. 2 to the control and drive module. The output of the half bridge is on line 7 and connects to inductor 8. It also connects to control and drive module 24 via line 19. DC blocking capacitor 9 is large enough that its value does not enter into the resonant calculation but acts simply to pass the AC with little or no impedance while totally blocking any DC component from flowing into the load. Inductor 8 and capacitor 10 make up a series resonant circuit that converts the square wave output of the half bridge to a sine wave at the resonant frequency. This is applied to the output load in this case gas discharge lump lamp 15 by a lines 16 and 11. Transformer 12 connected between lines 16 and 11 across the load provide power for the lamp's heaters on secondary windings 13 and 14.

Referring now to FIG. 3, control and drive module 24, which will be further discussed under the description of FIG. 5, receives the current feedback from current sensor 32 via lines 23 and 22. Output voltage across the load is fed back on line 20. This line also serves to feed back the phase of the sign wave that is presented across the load for resonant frequency correction. Heater current is fed back as a voltage drop across resistor 72 which is in series with the primary of heater transformer 12. This heater current equivalent voltage is fed to he control module 24 on ling 73. When power line carrier signal is used to send control information to the control and drive module, the signal is presented to the module through lines 25 and 26. Photo cell input which is either looking at the amount of light delivered by the load or the amount of light on the surface illuminated by the load is fed in through line 27. Manual control is supplied through line 28 and remote control when used comes in on line 30.

Referring to FIG. 4, the connection for the electro-luminescent or flat panel display is shown. The two points X and X are connected in FIG. 3 where the X and X's are to replace the circuitry to the right of the X's in FIG. 3. Inductor 8 is connected in the same manner, but capacitor 10 of FIG. 3 is replaced by the electrolumenescent panel itself 31. The panel is, in fact, a large capacitor, therefore, it serves not only as the load, but as the resonant capacitive element. The DC blocking capacitor of FIG. 9 is not needed since the load itself is a capacitor.

Referring now to FIG. 5, the microprocessor chip in this application is at PIC 16C71 micro controller by Micro Chip Technology, Inc. or equivalent. Power from the microprocessor is derived by DC bus 4 of FIG. 3 and flows through diode 41 and resistor 42 to reduce it's voltage to the 5 volts set by zener diode 44. It is further filtered by capacitor 45 and supplied to the microprocessor at the Vdd input 14 on line 46. The operating frequency of the processor chip is set by resistor 50 and capacitor 51 connected to the processor at the oscillator input 15 by line 52. The frequency is varied according to the application. For example, when driving a flat panel display, the frequency is between 800 and 1,000 hertz. When driving a high-intensity discharge lamp, the frequency may be as high as a 100 kilohertz or more. Typical fluorescent lamp applications operate in a frequency between 20 and 50 kilohertz. The microprocessor output is at Pins 6 and 7. Pin 6 is connected directly by line 18 to the drive point B to turn on the bottom transistor in the half bridge. Output Pin 7 is connected by line 53 to an oscillator to drive the top transistor at point A Since this transistor is not referenced to the common bus, an optoisolator must be employed. Power for the optoisolator to drive the transistor is created by charging capacitor 56 through diode 53 when the output of the bridge is low when the bottom transistor is on.

The voltage across the output load is fed back by line 21 through capacitor 57 which serves to block the DC and divided by voltage divider resistors 58 and 59 to a voltage that is acceptable to the processor. This AC voltage is fed directly by a line 72 to input on pin 3 for phase comparison information. It is further rectified by diode 60 and filtered by capacitor 62 and load resistor 61 to analog input 2 via line 63. The load current is sensed by sensor 32 of FIG. 3 and is fed in via lines 22 and 23, rectified by diode 64, filtered by capacitor 66 and resistor 65 and presented to analog input at pin 1 via line 67. The voltage representing the heater current is fed on line 73, rectified by diode 74 and filtered by capacitor 76 and fed by line 77 to the microprocessor. Local control of the output power may be adjusted by potentiometer 70, wiper of which is connected at analog input 17 via line 28. Resistor 71 in series with potentiometer 70 sets the minimum output level. An analog input voltage from the photo cell may be presented by a line 27 to analog input at Pin 18.

Remote control is normally a pulse width modulation control system, therefore, it is digital and will be presented by line 30 to digital input at Pin 12. If a power line carrier signal is sent, it is sensed on lines 25 and 26 at digital inputs 10 and 11 which look for changes on the power line signal at the zero crossing point. Two inputs are used to look for each half cycle of the power line.

FIG. 6 is a software flow chart for a high frequency power supply that is operating as a fluorescent ballast which is included to show of the complexity of function allowed by using a microprocessor as a inverter driver or ballast control element. The multiple software decisions allow for many operational advantages such as lamp start up and control if a lamp is suddenly removed from the fixture or fails while operating. The resulting action by the microprocessor allows for safer and more reliable operation while greatly extending lamp life. Each box rectangular box states the function implemented by the software and the diamond shaped boxes state the decision to be made. The arrows pointing at each rectangular box indicate the presets that are set into the software for each different type of ballast. The arrows pointing at the diamond shaped boxes shows the data needed to make the decision.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A power inverter for converting AC line power to DC power comprising:

a load;

a high frequency power supply for driving said load;

a half bridge inverter for converting DC power to a high frequency square wave;

a resonate network having at least one inductor and one capacitor coupled between said half bridge inverter and said load;

said resonate network connected with said half bridge inverter for converting said high frequency square wave to a sine wave;

a microprocessor connected to said half bridge inverter for driving said half bridge inverter at an appropriate frequency;

a feedback circuit for conveying voltage and current levels to said microprocessor from said load including software incorporated in said microprocessor whereby said voltage and current levels determine if any problems exist in operation of said load and which compensates for causes of any problems or alternately to shut down power supplied to said load or alternately to multiply said voltage and current levels to compute total power in watts supplied to said load and to adjust the frequency to maintain the required power in said load;

said load includes at least one fluorescent lamp;

said fluorescent lamp has separately driven heater cathodes and the amount of current currently used to drive at least one heater cathode is fed back to said microprocessor;

said microprocessor contains software sensing if the high heater current in said lamp starting process has begun as when a ballast is first turned "on" or when said lamp is inserted with the power already applied (relamping hot);

a software program in said microprocessor that monitors said heater cathode current to determine if said heater cathodes are properly heated (amount of current driving said heater cathodes has dropped); and said software program operates to then adjust the frequency such as to cause the voltage across said fluorescent lamps to rise until lamp ignition is accomplished.

2. The power inverter defined in claim 1, wherein:

at least one of said capacitors in said resonate network is said load in a flat panel display or electro-luminescent panel.

* * * * *